UNITED STATES PATENT OFFICE.

CHRISTIAN M. EDWARD SCHROEDER, OF NEW YORK, N. Y.

PAINT AND VARNISH REMOVER.

1,016,445.  Specification of Letters Patent.  Patented Feb. 6, 1912.

No Drawing. Application filed June 8, 1907, Serial No. 377,860. Renewed December 5, 1911. Serial No. 664,081.

*To all whom it may concern:*

Be it known that I, CHRISTIAN M. EDWARD SCHROEDER, a citizen of the United States of America, and resident of 221 Pearl street, New York city, New York, have invented certain new and useful Improvements in Paint and Varnish Removers, of which the following is a specification.

The present invention relates to a composition or mixture for softening surface coatings, as paint, varnish, or the like, in order that they may be easily removed and to the method or process of manufacturing such combination.

The chief difficulties encountered in the removal of paint and varnish are due to the fact that the most effective solvents are thin liquids of a volatile nature. These liquids, on account of their lack of viscosity, flow quickly from the surface to which they are applied, if it is horizontal, and more quickly if it is inclined or vertical. The volatility of these solvents causes them to disappear by evaporation from the surface from which it is desired to remove the coating of paint or varnish. As it is necessary, in order to utilize a solvent in removing paint or varnish, to have the coating in contact with the solvent for a period of time not only sufficient to soften the paint or varnish, but also to keep it softened while being removed, thin volatile solvents of the nature described, unmixed with other ingredients, are not effective.

For the purpose of overcoming both of these difficulties, my invention provides a paint and varnish remover which contains a volatile solvent and a substance which hereinafter will be termed a body. By the presence of this substance, the solvent is made thick and both its flow and evaporation retarded, to the end that the solvent is maintained in contact with the coating of paint or varnish long enough to soften it and keep it in a softened condition while it is being removed.

In its preferred embodiment, my composition consists of water, precipitated calcium acetate in a gelatinous state, and the solvents, alcohol, or its equivalent, and benzol in any desired amount. The various equivalents of these constituents may be substituted for those named and the benzol may be wholly omitted within the scope of my invention.

The substances are combined by mixing the desired quantity of alcohol with a solution of calcium acetate in a minimum quantity of water, that is, a solution which is saturated, or nearly saturated. The alcohol by its great attraction for water, causes the formation of a precipitate of calcium acetate, which remains in suspension as a spongy continuous mass. A quantity of benzol is now added, while the composition is stirred or otherwise agitated, and the stirring continued until a uniform and intimate mixture of the ingredients is formed. This mixture is thickened by the suspended and uniformly distributed precipitate of calcium acetate and does not flow from horizontal or vertical surfaces to which it is applied. The composition may be made in different proportions having different degrees of viscosity, and if a sufficiently strong solution of calcium acetate and a small proportion of alcohol be used, it becomes a stiff jelly. The voltatile solvents are protected from the air so that their evaporation is greatly retarded, and when the paint and varnish remover is applied, no external coating or crust forms on its surface. The precipitate of calcium acetate is of such a nature as to remain in suspension and does not tend to settle, so that my paint and varnish remover may be kept bottled indefinitely and be always ready for use.

A composition which has been found satisfactory is made up in the proportion of ten parts of saturated solution of calcium acetate, sixty parts alcohol and thirty parts benzol. Another formula contains ten parts of the saturated solution of calcium acetate, to which is added a mixture of equal parts alcohol and benzol, ninety parts. By varying the proportions of calcium acetate, the fluidity of the composition is increased or decreased. The first formula is suitable for application on vertical or inclined surfaces; the second is more fluid and is suitable for horizontal surfaces.

A composition similar to the one described may be made by adding a mixture of alcohol and benzol to a saturated or nearly saturated solution of calcium acetate. The latter is preferably stirred or agitated while the solvents are being added in small quantities. Other salts may be used in place of calcium acetate as a body, or acetone or ethyl acetate may be substituted for alcohol within the scope of my invention.

I have described certain preferred embodiments of my invention, but do not wish to be understood as limiting myself to the embodiments set forth.

What I claim and desire to secure by Letters Patent is:

1. A process for the manufacture of a paint and varnish remover which consists in dissolving a salt in water and adding thereto a volatile solvent for the coating, the volatile solvent containing an ingredient which will cause the salt to gelatinize.

2. A composition for removing surface coatings comprising water, a volatile solvent for the coating, and a body which consists of a salt which is soluble in water and substantially insoluble in the volatile solvent, the salt being in a gelatinous condition.

3. A composition for removing paint and varnish, comprising water, alcohol, benzol, and a body, the latter consisting of a salt in a gelatinous state.

4. A composition for removing paint and varnish, comprising water, alcohol, benzol, and a body consisting of a water soluble salt in a gelatinous condition.

Signed by me at New York city, this 4th day of June, 1907.

C. M. EDWARD SCHROEDER.

Witnesses:
FLETCHER P. SCOFIELD,
FRANK P. SIMONS.